United States Patent
Dang et al.

(10) Patent No.: US 10,790,232 B2
(45) Date of Patent: Sep. 29, 2020

(54) CONTROLLING WARP IN SEMICONDUCTOR LAMINATED SUBSTRATES WITH CONDUCTIVE MATERIAL LAYOUT AND ORIENTATION

(71) Applicant: International Business Machines Corporation, Armonk, NY (US)

(72) Inventors: Hien P Dang, Nanuet, NY (US); Sri M Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/132,382

(22) Filed: Sep. 15, 2018

(65) Prior Publication Data

US 2020/0091074 A1 Mar. 19, 2020

(51) Int. Cl.

| | |
|---|---|
| *H01L 23/538* | (2006.01) |
| *H01L 27/02* | (2006.01) |
| *H01L 23/532* | (2006.01) |
| *H01L 23/00* | (2006.01) |
| *G06F 30/17* | (2020.01) |
| *G06F 30/327* | (2020.01) |
| *G06F 30/367* | (2020.01) |
| *G06F 30/398* | (2020.01) |

(52) U.S. Cl.
CPC .......... *H01L 23/5383* (2013.01); *G06F 30/17* (2020.01); *G06F 30/327* (2020.01); *G06F 30/367* (2020.01); *G06F 30/398* (2020.01); *H01L 23/53228* (2013.01); *H01L 23/562* (2013.01); *H01L 27/0207* (2013.01)

(58) Field of Classification Search
CPC ........... H01L 23/5383; H01L 23/53228; H01L 23/562; H01L 27/0207; G06F 30/367; G06F 30/327; G06F 30/398; G06F 30/17
See application file for complete search history.

(56) References Cited

U.S. PATENT DOCUMENTS

| | | | |
|---|---|---|---|
| 6,183,592 B1 * | 2/2001 | Sylvester | ............ H01L 23/3735 |
| | | | 156/292 |
| 7,196,425 B2 | 3/2007 | Chiu et al. | |
| 2004/0023011 A1 | 2/2004 | Sumi et al. | |
| 2006/0071345 A1 | 4/2006 | Chiu et al. | |

(Continued)

FOREIGN PATENT DOCUMENTS

WO  WO-2008061122  11/2006

OTHER PUBLICATIONS

Appendix P Attached.

(Continued)

*Primary Examiner* — Sitaramarao S Yechuri
(74) *Attorney, Agent, or Firm* — Daniel P. Morris

(57) ABSTRACT

This invention is a laminated structure and methods used for electrically connecting one or more semiconductor chips to various external electrical connections where stresses within the laminated structure due to thermal cycle are reduced by adding conductive material to selected subareas of upper and lower layers in the structure such that the volume of conductive material in corresponding subareas is equal in amount and orientation within a threshold. This reduces differential stresses between the layers as temperature changes and accordingly reduces failures of materials and/or connections in the structure during manufacturing and operation.

18 Claims, 7 Drawing Sheets

(56) References Cited

U.S. PATENT DOCUMENTS

| | | | |
|---|---|---|---|
| 2007/0099422 A1 | 5/2007 | Wijekoon et al. | |
| 2007/0176317 A1* | 8/2007 | Morita | B29C 43/18 |
| | | | 264/138 |
| 2010/0149768 A1* | 6/2010 | Takaike | H01L 23/5383 |
| | | | 361/761 |
| 2013/0234325 A1 | 9/2013 | Dai et al. | |
| 2013/0334711 A1* | 12/2013 | Blackshear | H01L 23/49866 |
| | | | 257/778 |
| 2014/0078704 A1* | 3/2014 | Andry | H01L 23/49827 |
| | | | 361/764 |
| 2014/0307403 A1* | 10/2014 | Weichslberger | H01L 23/5389 |
| | | | 361/761 |
| 2016/0351419 A1* | 12/2016 | Lin | H01L 21/568 |
| 2018/0068861 A1* | 3/2018 | deVilliers | H01L 21/67115 |

OTHER PUBLICATIONS

U.S. Appl. No. 16/719,993, filed Dec. 19, 2019.
The Bending of Bonded Layers Due to Thermal Stress by Ahmad T. Abawi, Hughes Research Laboratories, Oct. 23, 2004.
Valdevit et al., "Organic substrates for flip-chip design: A thermo-mechanical model that accounts for heterogeneity and anisotropy", Elsevier 2007 (see p. 245), Science Direct, Microelectronics Reliability 48 (2008) 245-260.

* cited by examiner

CONTROLLING WARP IN SEMICONDUCTOR LAMINATED SUBSTRATES WITH CONDUCTIVE MATERIAL LAYOUT AND ORIENTATION

BACKGROUND

The present invention relates to controlling and reducing warping of substrates and more specifically, to controlling and reducing warping of organic substrate layers by patterning and orienting metal, e.g. copper, on different layers of these substrates.

To support the fast pace of advancements in electronics, i.e. Moore's law, board designers are pushing organic substrates to the limits. Substrates have grown from 40×40 millimeters to over 70×70 millimeters with finer interconnects and more complex layers. Even though the chips and the substrates are getting larger, they still have to meet the same industry standard for flatness. As the result, a lot more parts are being rejected for failing specifications from warping as a consequence of thermal stresses. It is no longer adequate to design these large substrates for electrical performance, and then release them for manufacturing. Many iterations are needed to optimize these designs for thermo-mechanical warpage.

Unfortunately, the current generation of software does not provide a simple path between electrical layout and warpage prediction with finite element analysis (FEA) software. The intermediate steps to bridge these two software domains are manually intensive and hard to automate. As a result, it takes a lot of time and effort to optimize the substrate design for warpage.

SUMMARY

In one embodiment, this invention is a laminated structure used for electrically connecting one or more semiconductor chips to various external electrical connections, e.g. connections on a printed circuit board. The laminated structure comprises one or more parallel upper layers on an upper side of and parallel to a flat reference plane and one or more one or more parallel lower layers on a lower side of and parallel to the flat reference plane. In a preferred embodiment, at least one of the upper layers and one of the lower layers has a conductive material patterned and disposed on a flat layer of non-conducting material. In preferred embodiments, the conductive material has a uniformed and constant thickness.

A corresponding pair of layers comprises one upper layer and one lower layer. In a preferred embodiment, the upper and lower layers, selected to be a corresponding pair, are an equal, or nearly equal distance from the flat reference plane. This distance can be measured by the number of layers the selected upper and lower layers are from the flat reference plane.

There are one or more upper tile subareas on the upper layer of the corresponding pair and one or more lower tile subareas on the lower layer of the corresponding pair. The upper and lower tile subareas are corresponding tile subareas when they are within a same vertical projection.

An upper line sub-pattern is the conductive material patterned on the upper tile subarea. The upper line sub-pattern has an upper sub-pattern area that is an area percentage of the upper tile subarea. The upper line sub-pattern area also has an upper resultant orientation.

A lower line sub-pattern is the conductive material patterned on the lower tile subarea. The lower line sub-pattern has a lower sub-pattern area that is an area percentage of the lower tile subarea. The lower sub-pattern area also has a lower resultant orientation.

For one or more corresponding subareas, the laminated structure is designed so the upper area percentage equals the lower area percentage within an area tolerance and the upper resultant orientation equals the lower resultant orientation within an orientation tolerance. With this structure the corresponding tile subareas deflect in the same amount and direction within a deflection tolerance as the laminated structure changes temperature. This reduces differential stresses between the layers as temperature changes and accordingly reduces failures of materials and/or connections in the structure during manufacturing and operation.

Also disclosed are embodiments of the invention that are a method of performing the design of a laminated structure, a method of manufacturing the structure, the structure used as a component in a larger system, and a medium structure that embodies the methods as software.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figures 1A, 1B:
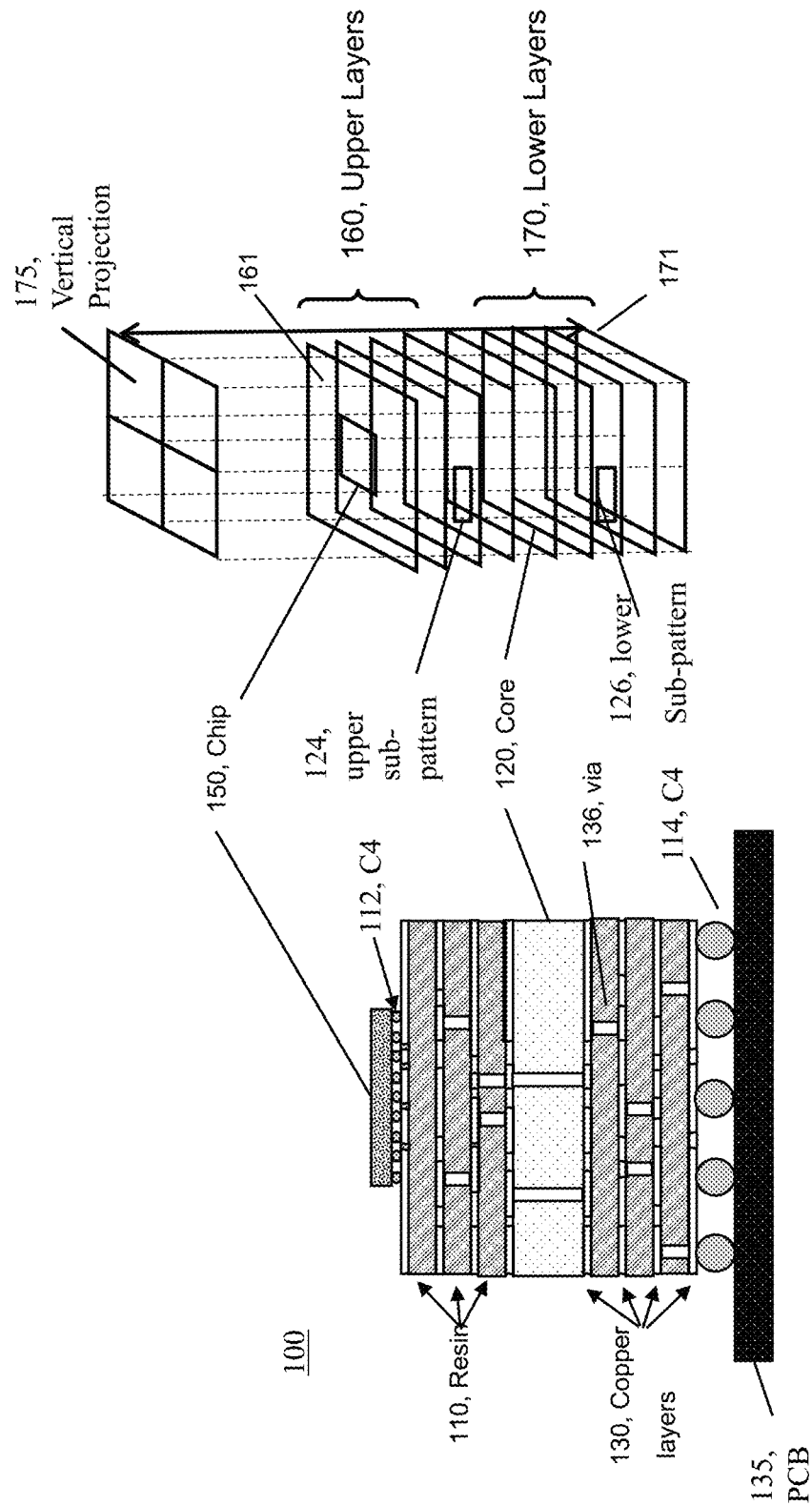
FIG. 1A is an illustrative block diagram of one embodiment of a laminated structure.
FIG. 1B is an isometric view of the laminated structure showing upper and lower layers with vertical projections defining tile subareas and line sub-patterns.

FIG. 1A is a block diagram of one embodiment of a laminated structure and FIG. 1B is a isometric view of the laminated structure showing upper and lower layers with vertical projections defining tile subareas and line subpatterns.

FIG. 1A shows an embodiment of a laminated structure 100. The structure 100, comprising layers that form the electrical interconnections between a semiconductor chip 150 and other external electrical connections, for example a printed circuit board (PCB) 135. Note that FIG. 1A is for illustrative purposes and the intent is not to show any functioning electrical connections that would be necessary to create a functioning electrical structure.

The chip 150 has a plurality of Controlled Collapse Chip Connections (C4) ball type connections 112, that, in a preferred embodiment connect to an electrical connection array, e.g. a Ball Grid Array (BGA), not shown, on one of the top layers of the laminated structure 100 to form an electrical and mechanical connection.

The layers 160, 170 in FIG. 1B, have patterns of electrical connections on some of the layers and/or passing through the layers, as vias, for example 136. The laminated structure, also referred to as a substrate 100 serves as vehicle to fan-out electrical connections between one or more chips 150 and the external connections, e.g. the PCB 135 and may contain passive electrical components as well.

The laminated structure 100 comprises a flat reference plane 120 and a plurality of upper layers 160 and lower layers 170 that are parallel to the flat reference plane and flat as well. In many preferred embodiments, the flat reference plane 120, also referred to as a core 120, is a made of a stiff material that gives rigidity and flatness to the laminated structure and the layers (160, 170) and provides for vias, electrical pathways to make connections between the upper 160 and lower 170 layers. Typically, the core 120 is between 400-800 um. However, it is desirable to reduce the thickness of the core to reduce the overall thickness of the laminated structure and to make drilling of via pathways through the core easier during manufacturing. Using this invention and due to the reduction of thermal stresses, the core thickness can be reduced to 100-200 um and perhaps the core 120 can be completely eliminated, reducing the core 120 location to a non-physical reference plane 120. In laminated structures that have a physical core 120, the reference plane is considered as plane passing through core center and being parallel to the top and bottom of the core. Cores 120 are made of various stiff materials, including for example: porous silicon carbide, ceramics, or organic material strengthened with glass fiber.

The layers (160, 170) are typically planes of non-conductive material 110, e.g. organic materials, resin, and polymers with conductive material 130 patterned and disposed on the surface of the non-conductive material 110. The conductive material 130 makes electrical connections and as described below can change the physical behavior of the layer on which they're disposed. Other materials can be disposed on the surface of the non-conductive material 110, e.g. to make passive elements like capacitors.

Conductive material includes copper (Cu), silver, gold, aluminum, tungsten, any other metallic material. We denote the layers on top of the core 120 as upper layers 160 and layers below the core as lower layers 170.

The bottom layer (one of the lower layers 170) establishes contact between the chip(s) 120 and laminated structure layers and the external world, e.g. PCB 135, through electrical connections 114. In a preferred embodiment these are C4 connections 114, although these C4 connections 114 can be of larger dimension than the C4 connections 112 connected to the chip 120.

The layers (160, 170) and core 120 are mechanically connected at their adjacent surfaces by adhesive or other means so the laminated structure has strength and behaves as a single mechanical unit. However, the physical connection of surfaces with different materials (or different combinations of materials) causes problems when the laminated structure experiences increases, decreases, or cycling of temperature during manufacturing and/or operation. These problems increase as the area of the laminated structure increases, particularly with the surface dimensions of the laminated structure being above 40×40 mm, and worse with surface dimensions above 70×70 mm.

One particular problem caused by changes in temperature is warpage. Warpage or bending is described in the reference "The Bending of Bonded Layers Due to Thermal Stress" by Ahmad T. Abawi, Hughes Research Laboratories, Oct. 23, 2004. As explained, "when two layers expand unequally, but are bonded together, there is a natural tendency for the composition to bend." Therefore, the layers (160, 170) of the laminated structure 100 will bend with thermal changes because the conductive material 130 and non-conductive material 110 expand at different rates due to temperature because they have different Coefficients of Thermal Expansion (CTE.) Another factor in the amount of bending of a layer with dissimilar materials is the Young's Modulus of each of the materials. The Young's Modulus, E, determines the amount of deformation of a material at a given force per area. As the reference points out, determination of the amount of bending is complex, depending on a number of factors: the CTE, E, the thicknesses of the materials, cross sectional area of the materials, moments of inertia, and temperature change.

The CTE (in parts per million per degree Kelvin) and E (in gigapascals) of a conducting material 130, copper (Cu) and non-conducting material 110 (Resin) are given in the table below.

|  | Cu | Resin |
|---|---|---|
| E (GPa) | 115 | 4 |
| CTE (ppm/K) | 17 | 95 |

As a non-rigorous example, we will examine one example layer that comprises a thickness of Cu deposited on and bound to a thickness of resin. Cu has a Young modulus of 115 GPa and CTE of 17 ppm/K, which are very different from resin with a modulus of 4 and CTE of 46 ppm/K.

The warpage of the single layer is driven by the coefficient of thermal expansion (CTE) mismatch between Cu (above) and the resin (below.) In this example, the upper thickness (Cu) has a lower CTE than the lower thickness (resin.) During manufacturing, the thicknesses are laminated together at about 125° C. After they are cooled down to room temperature, the lower thicknesses shrink more than the upper thicknesses, resulting in warpage of the layer, e.g. a concave shape opening lower in this example.

In just this single layer, the problem gets more complicated if the Cu deposits are at different locations on the thickness of resin. In this case, the bending happens non-uniformly over the surface of the layer.

To complicate the problem still further, the layers that are bending non-uniformly are attached to other layers (and/or the core) where the other layers are also bending non-uniformly in different ways.

As can readily be seen in this simple example, the difficulty in determining the bending effects of thermal stress in laminated structures 100 has prevented optimum design of these structures 100. Further, non-optimum design results in laminated structures 100 that have cores 120 that need to be thicker to stiffen the structure and that are more prone to delamination and electrical disconnection failures.

To further illustrate, the substrate 100 warpage is driven by the coefficient of thermal expansion (CTE) mismatch between upper layers 160 and lower layers 170. Assume, as an example, the upper layers 160 have a higher CTE than the lower layers 170. During manufacturing, the layers 160, 170 are laminated together at about 125° C. After they are cooled down to room temperature, the upper layers shrink more than the lower layers, resulting in warpage of the substrate, in a non-uniform way that is very difficult to predict.

This problem is becoming more important as the laminated substrates 100 become larger. With substrates with a dimension of 12×12 mm or less, warpage is minimal and most designs can be done with a single software package, spanning from electrical design, to component layout, all the way to mask generation for manufacturing. A common practice to balance the Cu percentage of different layers is by adding solid Cu islands to an empty area.

However, as the substrates get larger, substrate yield is severely affected if warpage is not tightly controlled. Two additional steps are added to handle the Thermal-Mechanical (TM) aspect of the design and modeling of the warpage level. These steps straddle multiple domains and multiple software packages, so there are many technical barriers to overcome. Currently, customized macros are used to extend the functionality of the layout software to handle the thermal-mechanical function. However, these programs add complexity and time to the design process.

To further understand how the novel present invention solves these problems, refer to FIG. 1A. In this figure, a vertical projection 175 is taken through the laminated substrate 100. The vertical projection 175 divides the layers (160, 170) into one or more tile subareas (161, 171.) The number of tiles subareas per layer may vary as discussed in FIG. 4a through FIG. 4c. Each tile will contain a subset of the pattern of conductive material 130 disposed on the respective layer, or sub-pattern (124, 126.) Depending on the positioning of the sub-pattern (124, 126) there will be none, some, or all, of the conductive material of the respective layer (160, 170) in a given tile subarea. Sub-patterns on upper layers 160 are upper sub-patterns 124. Sub-patterns on lower layers 170 are lower sub-patterns 126.

Figure 2:
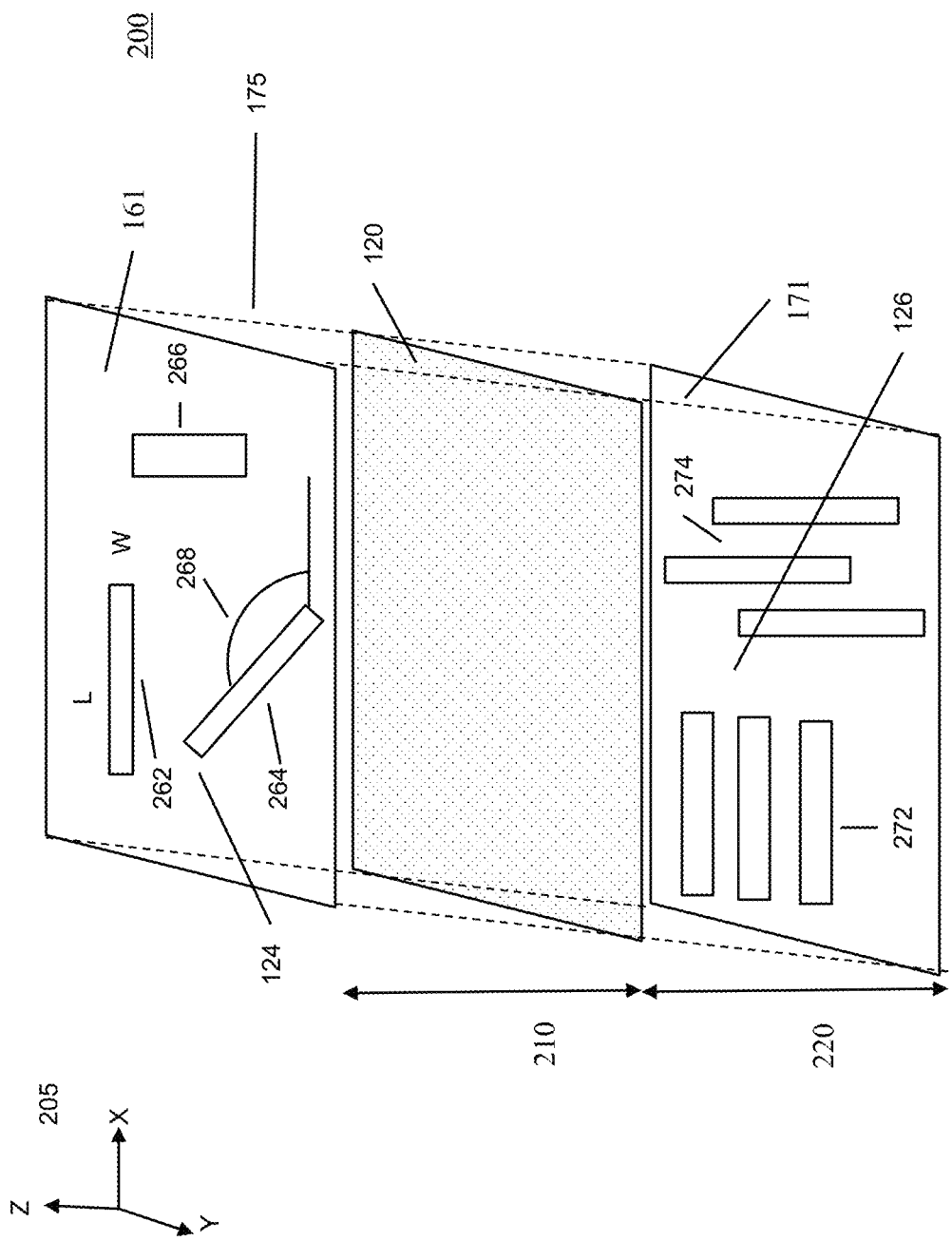
FIG. 2 is an isometric view of an upper and lower tile subarea (corresponding tile subareas) with line sub-patterns of different dimensions (e.g. areas), orientations, and percentage area of the total area of the tile subareas in a vertical projection.

FIG. 2 is an isometric view of selected upper tile subareas 161 of one of the selected upper layers 160 and a selected lower tile subarea 171 of one of the selected lower layers 170.

Both of the selected tile subareas (161, 171) are within one vertical projection 175 and are a corresponding pair of tile subareas.

In a preferred embodiment, the upper distance 210 of the upper tile subarea 161 from the flat reference plane 120 is equal to the lower distance 220 of the lower tile subarea 171 from the flat reference plane 120. In alternate embodiments, the upper tile subarea 161 can be an aggregate of tile subareas in two or more selected upper layers 160 treated as one upper tile subarea 161. Also, the lower tile subarea 171 can be an aggregate of tile subareas in two or more selected lower layers 170 treated as on lower tile subarea 171.

The coordinate system 205 is shown as a cartesian coordinate system reference to define direction and orientation of line sub-patterns (262, 264, 266, 272, 274) on the layers (160, 170) and/or direction and orientation of the line sub-patterns themselves, either individually or in aggregate. It is contemplated that other coordinate systems 205 can be used, e.g. cylindrical or spherical coordinate systems, and that the axis of the coordinate systems may or may not be orthogonal, as long as the coordinate system can be used to define the direction and/or orientation of features of this invention.

At this point we take note that terms like "above," "below," "left," "right," "vertical," "coordinate system," etc. are meant to show relative position and/or orientation of features of the laminated structure 100 and that while the structure 100 can take on any orientation which might alter these terms, the relative positions and/or orientation of the features the laminated structure 100 will not change. For example, the laminated structure 100 can be turned up-side down without affecting the definition or operation of the invention.

FIG. 2 shows various shapes (length, L and width, W) and orientations 268 of conductive material disposed on the upper tile subarea 161. Taken together, in aggregate, these various shapes are an upper line sub-pattern 124 within the area of the upper tile subarea. Also, take together the various shapes of conductive material (272, 274) are a lower line sub-pattern 126 in the lower tile subarea 171.

Each of the shapes of conductive material, for example shape 262, has a length L and width W and a depth, not shown. Each shape, for example shape 264, has a direction or orientation 268. As a non-limiting example, shape 262 has an orientation in the X-direction of coordinate system 205, shape 266 has an orientation in the Y-direction, and shape 264 has an orientation of angle 268 with respect to the x-direction.

The shapes 272 as part of the lower line sub-pattern 126 (272 and 274 in aggregate) of the lower tile subarea 171 are shown grouped together in an X-direction as the shapes 274 as part of the lower line sub-pattern are in the Y-direction as a group.

The length L, width W, depth, material type, orientation, and moment of inertia of each shape determine how the particular shape affects the bending behavior of the respective corresponding tile subareas (161, 171) during thermal changes/stress.

Therefore, all the shapes in a tile subarea, i.e. the line sub-pattern (124, 126) in aggregate affect the bending behavior of each of the tile subareas in the corresponding tile subareas (161, 171) respectively. These affects change as the amount of conductive material in the line sub-pattern (124, 126) changes as a percentage (by volume and/or mass, or area) of the non-conductive material making up the composite structure of the tile subarea. See description of FIG. 3 below.

In a preferred embodiment, the depth of the conductive material is considered uniform and constant across each sub-pattern area (124, 126) all tile subareas (161, 171) and layers (160, 170.) Also, in a preferred embodiment, the depth of the non-conductive material is considered uniform and constant across all tile subareas (161, 171) and layers (160, 170.) These embodiments are useful for laminated structures 100 that are made in a layering process where materials are layered with uniform thickness before being patterned.

In the embodiments where the depths of the conductive and non-conductive materials are uniform and constant, the percent of conductive material in the line sub-pattern (124, 126) in a tile sub-area (161, 171) can be determined by the ratio of the aggregate sub-pattern area (124, 126) and the area of the entire tile subarea (161, 171) on which the line sub-patterns (124, 126) respectively reside.

In these embodiments, a resultant orientation/direction of the sub-pattern area (124, 126) can be determined by weighting the area of each shape of the sub-pattern area in the direction/orientation of the respective shape and combining the weighted directions in a vector sum to determine the resultant orientation of the sub-pattern area (124, 126.)

For example, for lower tile subarea 171, the sub-pattern area 126 would be the sum of the areas of the three X-direction oriented shapes 272 and the three Y-direction oriented shapes 274, i.e., the total area of shapes 272 and 274 in aggregate, divided by the total area of the tile subarea 171. For the lower tile subarea 171, the resultant orientation of the total sub-pattern area 124 would be orientation of a resultant vector resulting from the vector sum of an X component with a magnitude of the sum of all the areas of the line sub-patterns (272, 274) in the X direction and a Y component with a magnitude of the sum of all areas of the line sub-patterns (272, 274) in Y direction.

In a preferred embodiment, the directions/orientation 268 are limited to the X, Y and 45 and 135 degrees directions. This is consistent with most of the line orientations on layers 260, 270 in laminated structures 100.

Figure 3:
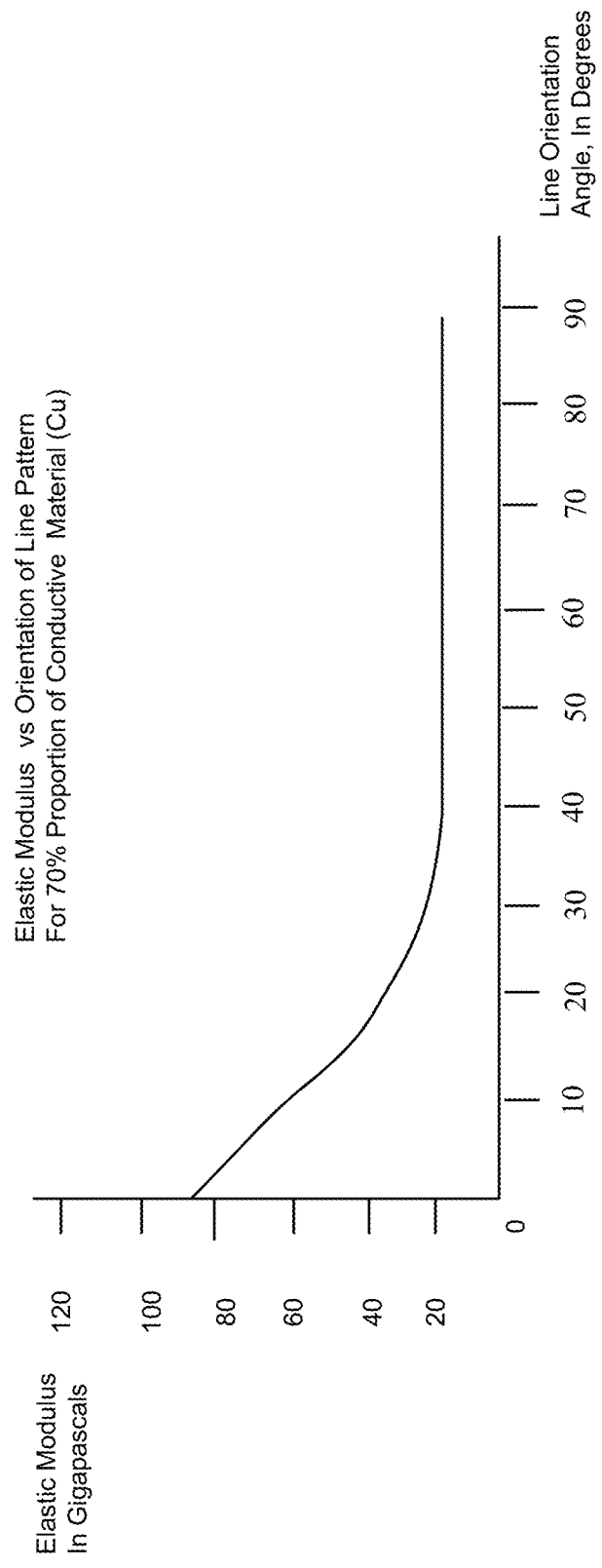
FIG. 3 is an illustrative graph showing how the Young's Modulus changes for a non-conductive material with lined patterns of conductive material as a function of the orientation of the conductive material (copper) for a given 70% proportion of conductive material to non-conductive material.

FIG. 3 is an illustrative graph showing how the Young's Modulus changes for a non-conductive material with lined patterns of conductive material, i.e. Cu, as a function of the orientation of the conductive material with respect to a chosen direction as a reference. In our example, we chose the reference direction as the x-axis of the reference coordinate system 205. Note that the Young's Modulus is shown for a given 70% percentage of conductive material to total amount of composite that makes up a tile subarea. If the conductive material is a different percentage of total composite material, the curve showing the Young's Modulus value with respect to orientation will be different. As such, there is a family of curves, each with a different percentage of conductive material to total amount of composite material.

The x-axis of the graph shows the line orientation in degrees of a line of copper with respect to the reference direction, e.g. the X-direction of the referential coordinate system 205 used to define location in the laminated structure 100. The y-axis of the graph shows the value of the Young's Modulus of elasticity in giga Pascals as a function of the orientation. For example, if the line sub-pattern or shape within a line sub-pattern is a line with a length L and a width W, the longer dimension, e.g. the length L is chosen to measure the orientation 268 with respect to the X-direction of the referential reference frame 205. For more complicated shapes, e.g. those that are not lines, an ellipse can be inscribed to best fit the shape and the major axis of the ellipse is chosen as the direction from which the orientation of the shape is determined.

From the table above, we know that the Young's Modulus of pure Cu is 115 and of a pure resin substrate is 4. However, when a conductive material is patterned as a line sub-pattern (124, 126) on a resin thickness within a tile subarea (161, 171) of a layer (160, 170) the Young's Modulus of the tile subarea composite varies with both the percentage of non-conductive material in the tile subarea composition and the resultant orientation of the line sub-pattern (124, 126.)

The graph shows one instance of a tile subarea with a 70% Cu composition. Different conductive (Cu) compositions would result in a family of curves. Therefore, a different curve would need to be used if the percentage of Cu of the line sub-pattern changed in the tile subarea. In this example, the Young's Modulus of the composition varies from about 82 at 0 degrees of resultant orientation to about 15 at 90 degrees of orientation. This is a Young's Modulus difference of about 5 times for a 0 to 90 degrees orientation change at this percentage of Cu line sub-pattern (70%) in the composite tile subarea.

As a result, the difference between the Young modulus and CTE of Cu and resin (in this example) and the percentage of each of these materials in the substrate layers has to be taken into account along with the positioning and dimensions of these materials when addressing warpage of the substrate.

The resultant orientation of the sub-pattern area (124, 126) would be the vector sum of an X component with a magnitude of the sum of the areas in the X direction and a Y component with a magnitude of the sum of the areas 274 in Y direction.

In a preferred embodiment, the directions/orientation 268 are limited to the X, Y, and 45 degrees directions. This is consistent with most of the line orientations on layers (260, 270) in laminated structures 100.

Figure 4C:
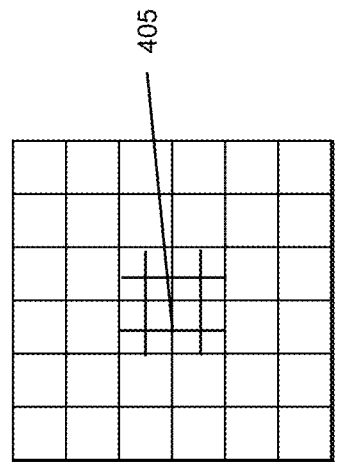
FIG. 4c shows a grid pattern for vertical projections that vary in the number of projections at various locations on the grid.
Figure 4B:
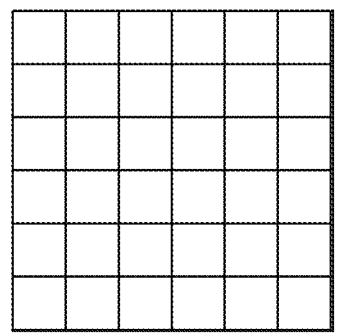
FIG. 4b shows an N×N grid pattern that is 6 on a side for a total of 36 vertical projections resulting in 288 (6×6×8) tile subareas.
Figure 4A:
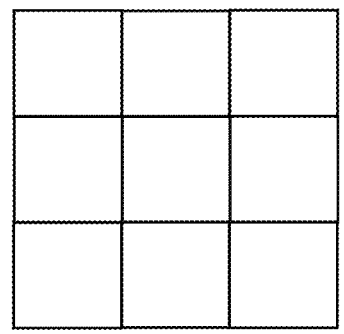
FIG. 4a shows an N×N grid pattern of three on a side for a total of 9 vertical projections.

FIG. 4a through FIG. 4c show alternative embodiments for taking vertical projections 175 of different N×N grid patterns through the laminated structure 100 to design, locate, and/or define tile subareas (161, 171) in the laminated structure 100.

The grid pattern of FIG. 4a shows an N×N grid pattern of three on a side for a total of 9 vertical projections. The 9 vertical projection define 9 tile subareas (161, 171) for each layer (160, 170) that the vertical projection intersects. For a laminated structure 100 of 8 layers (160, 170) a total of 72 (3×3×8) tile subareas (161, 171) are defined and located. In FIG. 4b, the N×N grid pattern is 6 on a side for a total of 36 vertical projections resulting in 288 (6×6×8) tile subareas (161, 171) defined for an 8 layer (160, 170) laminated structure 100.

The advantage of the vertical projections 175 of FIG. 4a is that they are fewer in number than those in FIG. 4b, which result in fewer calculations and analysis for the grid pattern projections 175 in FIG. 4a. Therefore, in a preferred embodiment, a grid pattern with fewer vertical projections would be used in situation where there are fewer sub-pattern areas (124, 126), sub-pattern areas with fewer combinations of shape areas and/or orientations, and/or sub-pattern areas in less critical positions in the laminated structure 100. On the other hand, if the sub-pattern areas (124, 126) are larger and/or more dense within one or more tile subareas, a finer analysis of FIG. 4b using more vertical projections might be used. While the N×N grid pattern of FIG. 4b would require more calculations, the design of each tile subarea might be easier because the number and complexity of the sub-pattern areas (124, 126) for each tile subarea (161, 171) would be reduced.

FIG. 4c shows an alternate preferred embodiment of a grid pattern for vertical projections 175 that vary in number of projections at various locations on the grid. For example, an overall N×N grid pattern 6 on a side is used as in FIG. 4b but 4 of the vertical projections, in this example at the center of the grid pattern, are further divided into 4×4 smaller vertical projections. The result is a pattern of vertical projections with 284 larger projections (6×6×8-4) and 128 smaller projections (4×4×8) at the center 405, with a total of 412 projections of different sizes depending on vertical location of the vertical projection.

The grid pattern of FIG. 4c might be used when designing a laminated structure 100 with localized areas 405 of temperature variation, e.g. the vertical projection below a semiconductor heat producing chip 150.

As the size of laminated structures 100 increases, it becomes apparent that the complexity and number of design calculations and modifications to the layers (160, 170) of the laminated structure 100 can grow geometrically. For example, for a larger (above 40×40 mm area dimension) laminated structure 100 requiring an N×N grid of 12 on a side would require design 1152 tile subareas, not accounting for finer grid vertical projections at locations on one or more chips 150.

The design method of the present invention simplifies this design analysis and reduces the calculation time to perform the design. The invention also provides accurate sub-pattern (124, 126) design at a tile subarea (161, 171) level to reduce delamination and contact failures during the manufacturing and operation of larger laminated structures 100.

Figure 5:
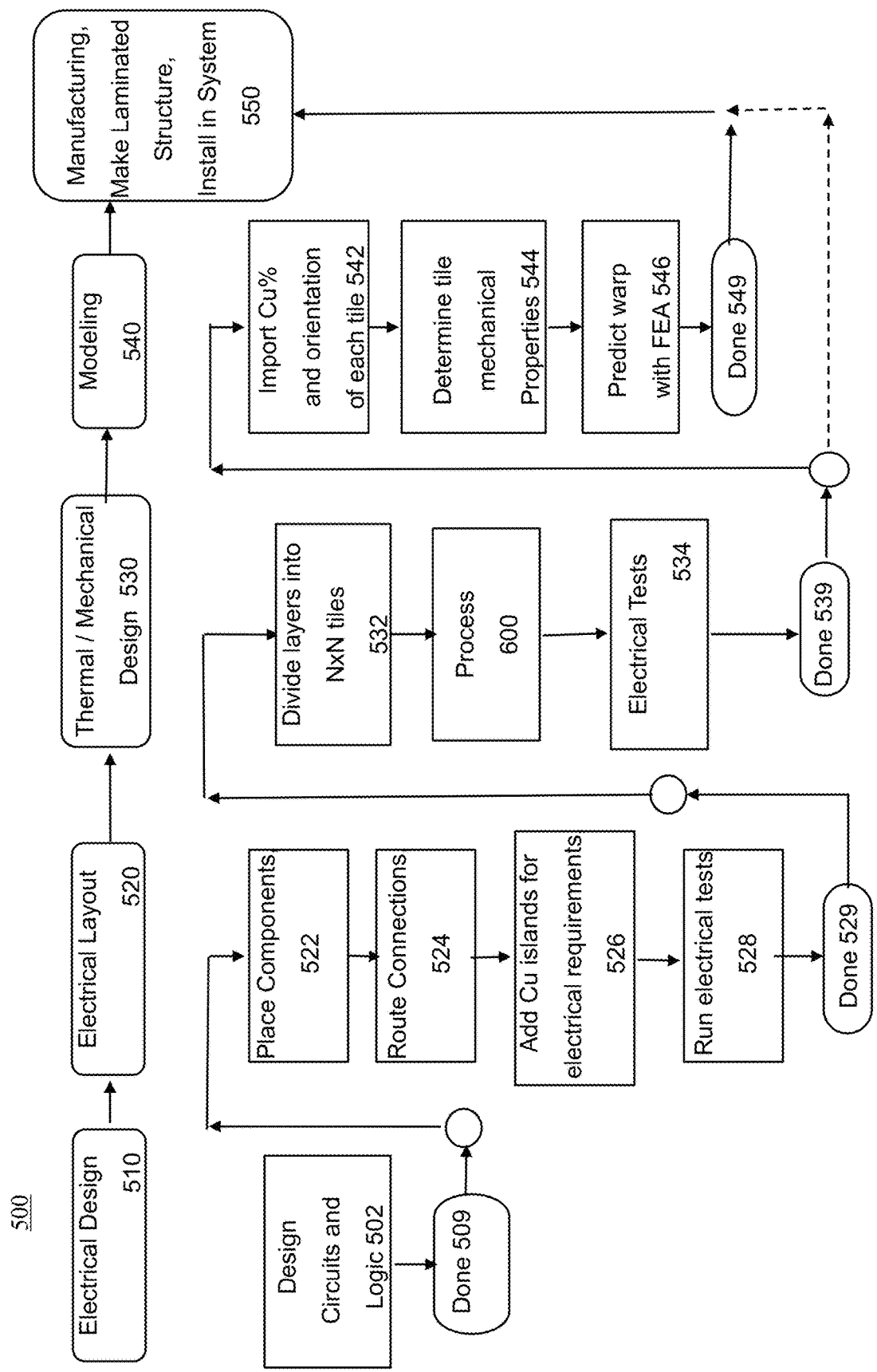
FIG. 5 is a flow chart showing some preferred uses of the present invention in an overall design and manufacturing process for designing, making, and installing laminated structures.

FIG. 5 is a flow chart showing some preferred uses of the present invention in an overall design and manufacturing process 500 for designing, making, and installing laminated structures.

This process 500 begins with the electrical design 510 that perform the intended function of the laminated structure 100. The electrical design 510 includes designing the circuits and logic 502 in the laminated structure 100. When the electrical design 510 is completed 509, it is passed on to an electrical layout process 520.

The electrical layout process 520 designs the placement of components 522, routes connections 524, adds locations for metallic (e.g. Cu) islands for electrical requirements 526, and performs electrical tests 528 to insure proper electrical function. When the electrical layout process is complete 529 the design is passed to the thermal and mechanical design process 530.

The thermal and mechanical design process 530 defines 532 the vertical projections 175 through the laminated structure 100 by choosing the location and size of the N×N projections 175 as described in FIG. 4a through FIG. 4c. Once a surface is divided into the N×N projections 175 the projections cut each of the layers (160, 170) vertically, e.g. along the vertical axis of the laminated structure 100 to create the tile subareas (161, 171.)

Once the tile subarea (161, 171) are defined, the sub-pattern areas (124, 126) on each tile subarea (161, 171) are determined from their placement, routing, shape, and dimensions as determined by the electrical layout 520.

At this point, process 600 (described below) is performed to select the tile subareas (161, 171) on which an amount and orientation of conductive material will be added in order to minimize stresses within the laminated structure 100 as temperatures change.

Electrical testing 534 is performed again to determine that the electrical performance characteristics of the laminated structure 100 are satisfactory after process 600 changed the design of the various tile subareas (161, 171.) If the electrical performance fails, the failed circuits are corrected. If the electrical performance is satisfactory, the thermal and mechanical design process 530 terminates 539.

When the thermal and mechanical design process 530 is completed 539, the designer chooses either to do further modeling by performing a modeling process 540 or use the current changes to the amount and orientation of conductive material in a manufacturing and design process 550.

If the modeling process is chosen, the changes in amounts and orientation of conductive material enters into the model 542 and the mechanical properties of each of the tile subareas (161, 171) and the laminated structure overall 100 are determined 544 for the new design. After this is done, warpage is determined for the laminated structure 100 for various changes in temperature 546, e.g., by performing a finite element analysis (FEA.) If the warpage of the laminated structure and each of the layers (160, 170) is within accepted design tolerances, the modeling process 540 ends 549 and the design is passed to the manufacturing process 550.

The manufacturing process 550 uses the design to control various apparatus to make the laminated structure 100. For example, the manufacturing process 550 starts with one or more initial layers and layers material upon them. Etching, masking, deposition, and/or other known process are performed to put the line sub-patterns on the layers. In preferred embodiments, the manufacturing process 550 will electrically and mechanically attach the chip 150 (or multiple chips 150) to the laminated structure 100 and/or electrically and mechanically attach the laminated structure to another level of connection, e.g. a printed circuit board (PCB) 135. In some preferred embodiments, the laminated structure 100 with the connections to the chip(s) 150 and PCB 135 are mechanically and electrically connected to larger computer systems.

Figure 6:
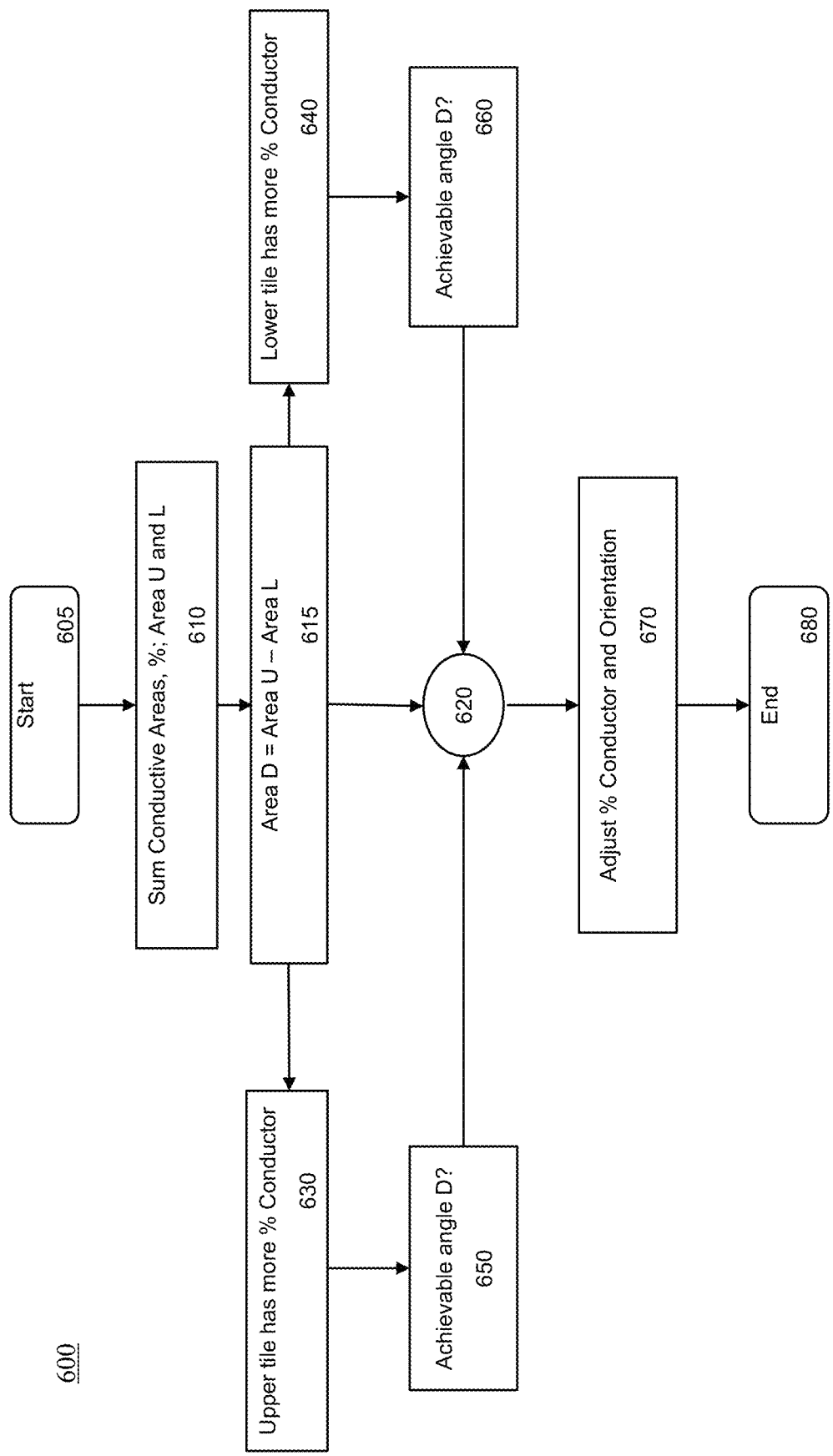
FIG. 6 is a flow chart of a preferred embodiment of the design and manufacturing process for warp reduction.

FIG. 6 is a flow chart of a preferred embodiment of the design and manufacturing process 600 for warp reduction.

The novel warp reduction process 600 allows the design of line sub-patterns to be automatically altered to reduce overall stress between upper layers 160 and lower layers 170 and/or anywhere within part or all of the laminated structure 100. Unlike the prior art which substantially makes these determinations manual with limited accuracy and the use of trial and error, the warp reduction process 600 simplifies a complex problem, corrects stress imbalances at a tile subarea (161, 171) dimensions, and permits corrections in the line sub-pattern (124, 126) design before making physical structures in the manufacturing process 550. The designer can choose tile subarea sizes small enough to reduce stress at very small areas. The warp reduction process 600 reduces complexity so that certain designs can be performed without the use of Finite Element Analysis (FEA.) In some preferred embodiments, the warp reduction process 600 can easily be integrated within existing electrical layout processes 550, models 540, and/or manufacturing processes 550.

To minimize the warpage effect, the warp reduction process 600 creates designs that minimize the difference of the CTE and the Young modulus effects of materials in the upper 160 and lower 170 layers of the substrate about the core 120. In alternative embodiments, the flat reference plane 120 can be placed between two upper layers 160 and/or two lower layers 170, rather than on the plane of the core 120. This embodiment is used to minimize stresses and warpage effects between two or more upper layers 160 or two or more lower layers 170.

The warp reduction process 600 gives an optimal amount and orientation of conductive material on one or more of the layers (160, 170) to achieve an optimal balance of materials throughout the laminated structure 100 to minimize thermal stresses between layers (160, 170) and throughout the laminated structure 100 for any electrical layout 520.

In some embodiments, the warp reduction process 600 can even design an amount of warpage on a tile subarea level, if the designer wants to design some level of bending of a tile subarea at a location within the laminated structure 100. For example, after determining the optimal amount and orientation of conductive materials for minimizing thermal stress and bending, an amount of conductive material can be added or removed to cause bending in a particular direction.

In some preferred embodiments, the warp reduction process 600 can determine what amounts, shapes, and/or orientations of conductive material needs to be added (or deleted) from a design or tile subarea before the design designates areas of conductive fill. At this stage of the design, a majority of the sub-patterns are lines and pads and the determination of the position, shape, and/or orientation of conductive material is simplified because there is more space on the tile subareas available.

Data indicates that using the warp reduction process 600 reduces bending of layers (160, 170) below 10%, and in some cases less than 5%, from an ideal flat plane, the deflection tolerance. This is over a 50% improvement over some prior art methods.

In general, Area D is the difference in the conductive material (e.g. Cu) area between the upper (AreaU) and lower (AreaD) tile subareas. There are three cases: upper tile has more Cu (AreaD>0) in step 630, the lower tile has more Cu (AreaD<0) in step 640, and the same amount (AreaD=0), covered in step 670. AngleU and AngleL are the orientations of the weighted averages of the Cu lines in the upper and lower tiles, respectively. The weights are determined by the areas of the collection of lines of the same angle.

The warp reduction process 600 starts 605 after the sizes and/or positions of the vertical projections 175, layers (160, 170) corresponding tile subareas (161, 171) and line sub-patterns (124, 126) have been identified, as described above.

A determination of the percentage of conductive material is made for each of the corresponding tile subareas (161, 171.) In this embodiment, it is assumed that one of the tile subareas (161 or 171) in the corresponding tile subarea pair (161, 171) is in an upper layer 160, i.e. an upper tile subarea 161 and the other tile subarea 171 is in a lower layer 170, i.e. a lower tile subarea 171. We'll also assume that the upper tile subarea 161 and the lower tile subarea 171 are the same distance from the flat reference plane 120. For example, the distance 210 and 220 in FIG. 2 are equal with in a layer distance tolerance. The layer distance tolerance is less than or equal to the depth of an average layer (160, 170.) More preferably, the layer distance tolerance approaches zero.

It is also assumed in this embodiment, that the conductive material is copper, Cu, and that the percentage area of conductive material is the percentage area of Cu line sub-patterns (124, 126) with respect to the total tile subarea (161, 171) on which the line sub-patterns, e.g. the aggregate of 262, 264, and 266; or the aggregate of 272 and 274; respectively, are disposed.

The warp reduction process 600 is a process for warp prediction, correction, and reduction. In this embodiment of the warp reduction process, the Cu percentages of the aggregate area of the line sub-pattern 124, e.g. the area of 262, 264, and 266 in aggregate, to the area tile subarea 161 on a pair of corresponding tile subareas (161, 171) is determined. The aggregate line sub-pattern area 124 on subarea 161 as an area percentage (Cu) of the tile subarea, e.g. 161 is determined. Then the aggregate line sub-pattern area 126 on subarea 171 as an area percentage (Cu) of the tile subarea, e.g. 171 is determined. The percentage of Cu for the two tile subareas in the corresponding tile subarea pair are compared 615 to obtain a percentage area difference between the two tile subareas (161, 171) in the corresponding tile subarea pair (161, 171.)

Step 615 determines the difference in total area of the Cu line sub-patterns for the upper 161 and lower 171 tile subareas. In FIG. 6, the total line sub-pattern area 124 for the upper tile subarea 161 is designated "Area U," and the total line sub-pattern area 126 for the lower tile subarea 171 is designated "Area L." The difference between the upper and lower line sub-pattern areas is designated "Area D." Area D is the area (proportional to amount by volume or by mass, in a preferred embodiment) of Cu that needs to be added to the tile subarea with less Cu area in order to achieve a balance of thermal stresses between the pair of corresponding tile subareas, e.g. to have the same curve defining the Young's Modulus effect in FIG. 3 for both the upper and lower tile subarea.

If the area difference, Area D, is larger than a certain threshold of area difference, then the empty areas may be selectively filled with solid Cu until the overall Cu % are balanced. There is no attempt to balance the Cu orientation in this step. In a more preferred embodiment, an orientation for this added Area D will be determined in later steps of the process 600.

In a preferred embodiment, the area threshold, Area D as a percentage of the respective tile subarea, is more than 10%. In a more preferred embodiment the area threshold is more than 5%, or even more preferred more than 1%.

After the Area D is determined in step 615, a determination is made whether the upper tile subarea 161 has a higher percentage Cu (% Cu) or if the lower tile subarea has the higher % Cu. This determination causes a branch to step 630 if the % Cu is higher in the upper tile subarea 161, or a branch to step 640, if lower tile subarea 171 has a higher percentage Cu (% Cu.)

In a third case, the Area U and Area L are equal with no difference, i.e. Area D=0. In this case, equal amounts of Cu are added to both the upper 161 and lower 171 tile subareas to just affect the orientation of total line sub-patterns. See step 670.

Now that we know how much Cu to add to achieve the desired % Cu, the orientation angle of the added Cu in each of the corresponding tile subareas (161, 171) is determined in one of Step 630, 640, or 670. This information is used to determine the orientation of the added Cu to balance the tile subareas in the corresponding pair of tile subareas. The warp reduction process is repeated for one or more of the corresponding pairs of tile subareas (161, 171) until we achieve the desired balancing of the layers within the laminated structure 100 at a tile subarea dimension. In one preferred embodiment, the warp reduction process 600 operates on all corresponding pairs of tile subareas (161, 171) so the tile subareas are balanced both in Cu % and orientation throughout the entire laminated structure 100. At this point, the design can be used in further structural modeling and/or manufacturing as discussed in the description of FIG. 5.

Since the Cu matching is done at the tile subarea level, the corresponding tile subareas and corresponding layers (being a aggregate of the tile subareas in the respective layer) are well matched and the result is the optimal Cu balance for thermal stress for a given layout. In a preferred embodiment, process 600 performs with no iterations needed.

Step 630 is performed if the upper tile area 161 has a higher Cu % than the lower tile area 171.

Here is example pseudo code describing step 630:
AreaD>0: Add Line to Lower tile, size=AreaD, angle=AngleD $$\text{Angle}U = (1/\text{Area}U)*[\Sigma(\text{Area}i*\text{Angle}i)i=1\rightarrow N]$$

$$\text{Angle}D = (1/\text{Area}D)*[\text{Angle}U*(\text{Area}D+\text{Area}L)-\Sigma(\text{Area}i*\text{Angle}i)i=1\rightarrow M]$$

In step 630, the difference of Cu (conductive material), Area D, is added to the lower tile subarea 171 because the Cu % in the lower tile subarea is less. This additional Cu makes the Cu % in each tile subarea of the pair of corresponding tile subareas (161, 171) equal. Accordingly, the curve of FIG. 3 defining the Young's Modulus (selected from a family of curves varying by Cu %) for each of the tile subareas with respect to orientation will be the same since both tile subareas have the same Cu %.

The orientation of the area of the upper line sub-pattern 124 in the upper tile subarea 161 is then determined. The amount of upper line sub-pattern area oriented in the x-direction (as a percentage of the tile subarea) is determined as a magnitude of an "area vector component" in the x-direction. In like manner, the amount of upper line sub-pattern area oriented in the y-direction is determined (as a percentage of the tile subarea) as a magnitude of an "area vector component" in the y-direction. The x and y components are combined by a vector addition to obtain a magnitude and direction of the resultant vector, being an "upper resultant vector," where the direction angle is the orientation of the total line sub-pattern 124 area in the upper tile subarea 161 and the upper resultant vector magnitude is the Cu area (percentage of tile subarea) having an effect on the upper tile subarea 161 in the direction of orientation of the upper resultant vector.

The same determination is made for the lower line sub-pattern 126 in the lower tile subarea 171, except that a Cu line with Area D is added with an unknown orientation as a vector component to determine a "lower resultant vector" with an unknown direction.

The upper resultant vector is set equal to the lower resultant vector and the unknown direction of the added Area D is determined.

Step 640 is performed if the lower tile area 171 has a higher Cu % than the upper tile area 161.

Here is example pseudo code describing step 640:
AreaD<0: Add Line to Upper tile, size=AreaD, angle=AngleD $$\text{Angle}L = (1/\text{Area}L)*[\Sigma(\text{Area}i*\text{Angle}i)i=1\rightarrow M]$$

$$\text{Angle}D = (1/\text{Area}D)*[\text{Angle}L*(\text{Area}D+\text{Area}U)-\Sigma(\text{Area}i*\text{Angle}i)i=1\rightarrow N]$$

The calculations are the same for step 640 as for 630 except that a line with Area D is added to the upper tile subarea. The orientation/direction of the added Area D is determined in an analogous fashion.

Step 670 is performed if the lower tile area 171 and the upper tile area 161 have the same Cu %.

Here is example pseudo code describing step 670:
AreaD=0: Add Lines to both tiles, same size, different angles
New lines: size=AreaNew, angles=AngleNewU, AngleNewL $$[\Sigma(\text{Area}i*\text{Angle}i)i=1\rightarrow N+\text{AreaNew}*\text{AngleNew}U]=[\Sigma(\text{Area}i*\text{Angle}i)i=1\rightarrow M+\text{AreaNew}*\text{AngleNew}L]$$

Pick AreaNew, AngleNewU, Solve for AngleNewL

We compare each tile subarea (161 or 171) with corresponding tile subarea, e.g. (171, 161) in the corresponding pair of tile subareas. Again, for easy book keeping, we denote U for the area of the upper tile subarea and L for area of the lower tile subarea. Thus, AreaU and AreaL are the Cu areas (line sub-pattern areas) of upper and lower tiles subareas, respectively.

For the AreaD=0 case, step 670, there are multiple solutions depending on how much Cu is to be added (AreaNew) and the desired final angle (AngleNewU). This case is also used when a solution cannot be reached with the other two branches.

Steps 650 and 660 determine if the orientation of add Cu is achievable where Cu is added to the lower tile subarea (step 630) or to the upper tile subarea (step 640), respectively. If the orientation is unachievable step 670 is run.

The general concept is to add some amount of Cu to each pair of tiles to achieve equivalent average mechanical properties, such as Young modulus and CTE in both X and Y directions by making the percentage of Cu area of the total area of the tile subarea. Then the orientation of the added Cu area is determined to achieve a vector equivalence between the tile subarea in the corresponding pair of tile subareas.

After process 600 determines the orientation for each added line sub-pattern for each pair of corresponding tile subareas (161, 171) the process 600 ends 680. The information defining the amount of conductive material, e.g. Cu, to add to each of the tile subareas (161, 171) in each pair of corresponding tile subareas (161 and 171) and their respective orientations 268 is then used either by modeling process 540 and/or the manufacturing process 550 in process 500.

In a preferred embodiment, if the final difference in orientation between the upper and lower orientation (an orientation tolerance) is less than 10% the process 600 can end.

Figure 7:
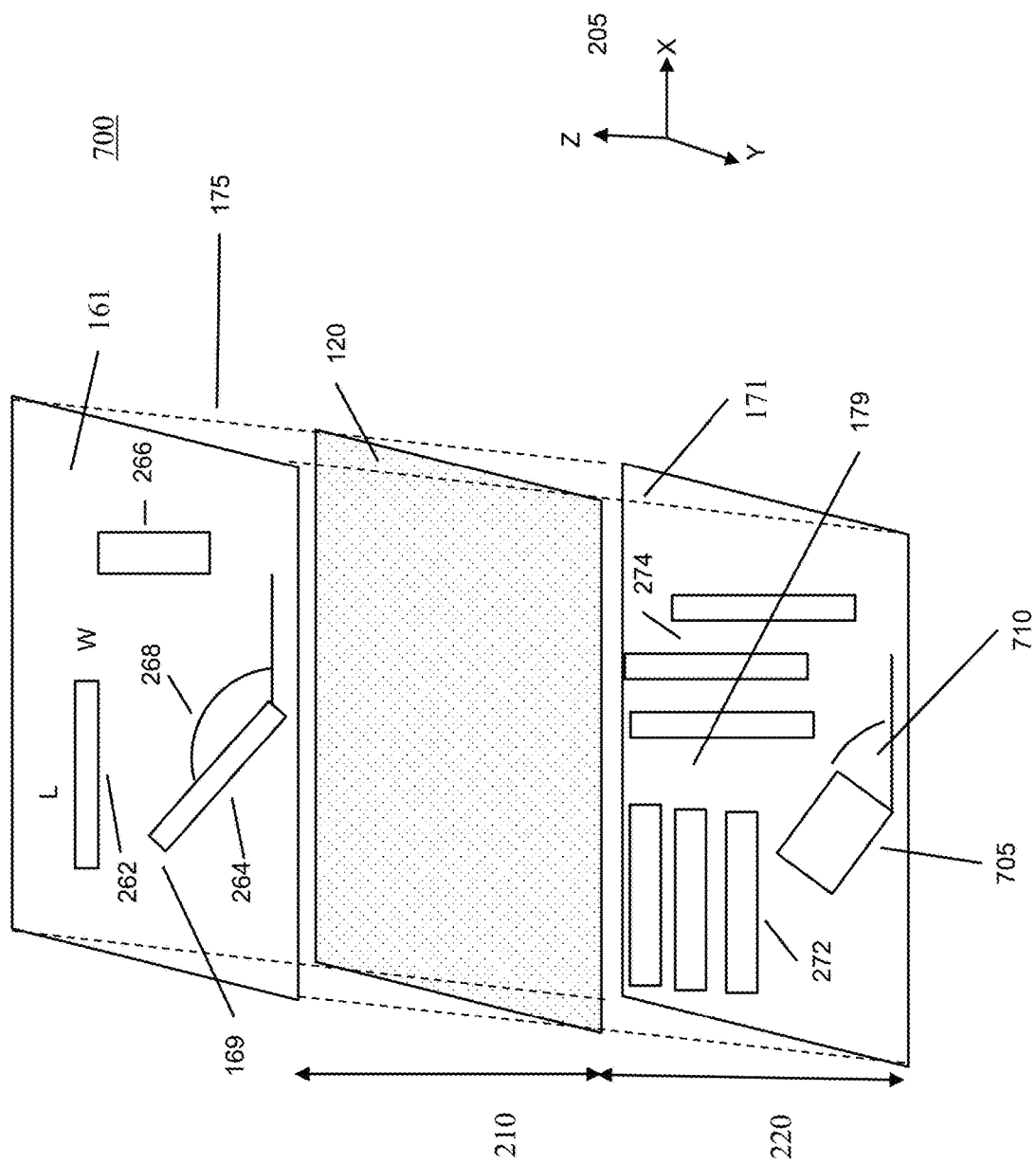
FIG. 7 presents some illustrative example using the warp reduction process.

FIG. 7 presents some illustrative example 700 using the warp reduction process 600. The example 700 uses features presented in FIG. 2 and all reference numbers in FIG. 7 that are the same as FIG. 2 have the same description in meaning.

In example 7, it has been determined that the total area of the line sub-patterns (262, 264, and 266) in the upper tile subarea 161 is greater than the total area of the line sub-patterns (272 and 274). Therefore, an additional area of Area D has to be added to the lower tile subarea 171. This Area D 705 will have an unknown orientation of 710 to balance the thermal stress effects of the upper 161 and lower 171 tile subareas.

Assuming the areas (e.g. L×W) of each of the lines 262, 264, and 266 is U/3.

Then the total line sub-pattern area in the upper tile subarea 161 would be U.

Assuming the areas of each of the original lines 272 and 274 in the lower subarea 171 is L/6. Then the total line sub-pattern area in the lower subarea 171 would be L.

The area difference determined in step 615 is:

$$\text{Area}D = U - L.$$

This is the area 705, Area D, that needs to be added to the lower tile subarea 171, since U is larger than L, as determined in step 615.

To determine the orientation of the added area 705, we must determine the magnitude and direction of the upper resultant vector in the upper tile subarea 161 and the magnitude and direction of the lower resultant vector in the lower tile subarea 171. The lower resultant vector will include the component (area 705 and direction 710) from area 705, but since the direction 710 of the added area Area D is unknown, the direction 710 will be determined by setting the upper and lower resultant vectors equal in a vector equation.

Area 262 has a component in the positive x-direction of U/3. Assuming that area 264 has a direction 268 of 135 degrees, it has a x-direction component of −U(0.707/3) and a y-direction of U(0.707/3). Area 266 has a y-direction component of U/3.

Therefore, normalizing by the area, of the upper tile subarea, A, the upper resultant vector has the following x and y direction components:

a. $x\text{-direction}: \frac{1}{3}(U/A) - 0.707/3(U/A) = 0.098 U/A$ b. $y\text{-direction}: \frac{1}{3}(U/A) + 0.707/3(U/A) = 0.569 U/A$ For the lower tile subarea 171, areas 272 have a magnitude (combined) of L/2 in the x-direction and the Area D has an x component of −(U−L)cos(180−theta), where theta is 180 degrees minus angle 710.

Areas 274 have area (combined) of L/2 in the y-direction and Area D has a y component of +(U−L) sin(180−theta).

Therefore, normalizing by the area, of the upper tile subarea, A, the lower resultant vector has the following x and y direction components:

$x\text{-direction}: [L/2 - (U-L)\cos(180-\text{theta})]/A$ $y\text{-direction}: [L/2 + (U-L)\sin(180-\text{theta})]/A$ Setting the upper and lower resultant vectors equal in the x and y directions:

$x \text{ direction}: 0.098 U = [L/2 - (U-L)\cos(180-\text{theta})]$ a. $\text{theta} = \arccos\left[(0.098U - L/2)/(U-L)\right] - 180$ b. or for the y-direction: $0.569U = [L/2 + (U-L)\sin(180-\text{theta})]$ i. $\text{theta} = \arcsin\left[(0.569U - L/2)/(U-L)\right] - 180$ The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A laminated structure for electrically connecting to one or more semiconductor chips comprising:
   one or more parallel upper layers on an upper side of and parallel to a flat reference plane, at least one of the upper layers being a conductive material patterned with a uniform thickness disposed on an upper flat layer of non-conducting material;
   one or more parallel lower layers on a lower side of and parallel to the flat reference plane; at least one of the lower layers being the conductive material patterned with the uniformed thickness disposed on a lower flat layer of the non-conducting material; a selected upper layer and a selected lower layer selected as a corresponding pair of layers, and one or more upper tile subareas on the selected upper layer and one or more lower tile subareas on the selected lower layer, the upper and lower tile subareas being corresponding tile subareas when the upper and lower tile subareas are within a same vertical projection;
   an upper line sub-pattern being the conductive material patterned on the upper tile subarea, the upper line sub-pattern having an upper sub-pattern area that is an upper percentage area of the upper tile subarea and the upper sub-pattern area having an upper resultant orientation;
   a lower line sub-pattern being the conductive material patterned on the lower tile subarea, the lower line sub-pattern having a lower sub-pattern area that is a lower percentage area of the lower tile subarea and the lower sub-pattern area having a lower resultant orientation, wherein the upper percentage area equals the lower percentage area within an area tolerance and the upper resultant orientation equals the lower resultant orientation within an orientation tolerance, so the corresponding tile subareas deflect in the same amount and direction within a deflection tolerance as the laminated structure changes temperature,
   and wherein each of the corresponding pairs of layers, the lower resultant orientation and the upper resultant orientation of the sub-pattern areas are determined by weighting directions in a vector sum and where one or more of the vector components in the vector sum is weighted by the area of the respective sub-pattern area in the direction of the vector component.

2. A laminated structure, as in claim 1, wherein the conductive material is one or more of the following: a metal, copper, silver, gold, aluminum, and tungsten.

3. A laminated structure, as in claim 1, where the non-conductive resin is one or more of the following materials: an organic material, a resin, and a polymer.

4. A laminated structure, as in claim 1, where the surface area of the laminated structure is greater than 40 mm×40 mm.

5. A laminated structure, as in claim 1, where the flat reference plane is a physical, flat layer of a thickness below 800 microns.

6. A laminated structure, as in claim 1, where the flat reference plane has no physical structure but is a reference plane in the laminated structure.

7. A laminated structure, as in claim 1, where first and second layer are equidistant from the flat reference plane, within a distance tolerance.

8. A laminated structure, as in claim 1, where the tile subareas are less than ⅑ of the area of the surface of the laminated structure.

9. A laminated structure, as in claim 1 where there are a plurality of tile subareas, at least two of which have different areas.

10. A laminate structure, as in claim 1 where the direction of the line patterns is only one or more of the following planar directions: an x-direction, a y-direction orthogonal to the x-direction, and 45 degrees and 135 degrees between the x and y directions.

11. A laminated structure, as in claim 1, designed without using Finite Element Analysis (FET) to determine an amount of conductive material added to a layer to make the upper and lower percentage areas equal.

12. A laminated structure, as in claim 1, further comprising one or more other materials that are disposed on one or more of the surfaces of non-conductive material, the other materials including: a passive element, a capacitor, and a chip.

13. A laminated structure, as in claim 1, further comprising one or more external connections, the external connections electrically connected to one or more chips in the structure.

14. A laminated structure, as in claim 13, where one or more external connections is an external C4 connection, at least one of the external C4 connections being of larger dimension then one or more chip C4 connections on the chip.

15. A laminated structure, as is claim 14, where one or more of the chip C4 connections is connected to one of the external C4 connections through one or more vias through the laminated structure.

16. A laminated structure, as is claim 14, where non-conducting material is between 100 and 200 micrometers (um) thick.

17. A laminated structure, as in claim 1, where there are a plurality of tile subareas, at least two of the tile subareas having different areas, and the smaller tile subareas are in the same vertical projection of high heat production in the structure.

18. A laminated structure, as in claim 1, where the flat reference plane is one of the following: a non-physical reference plane, a plane made of stiff material, and a core less than 200 um in thickness.

* * * * *